Patented Dec. 30, 1947

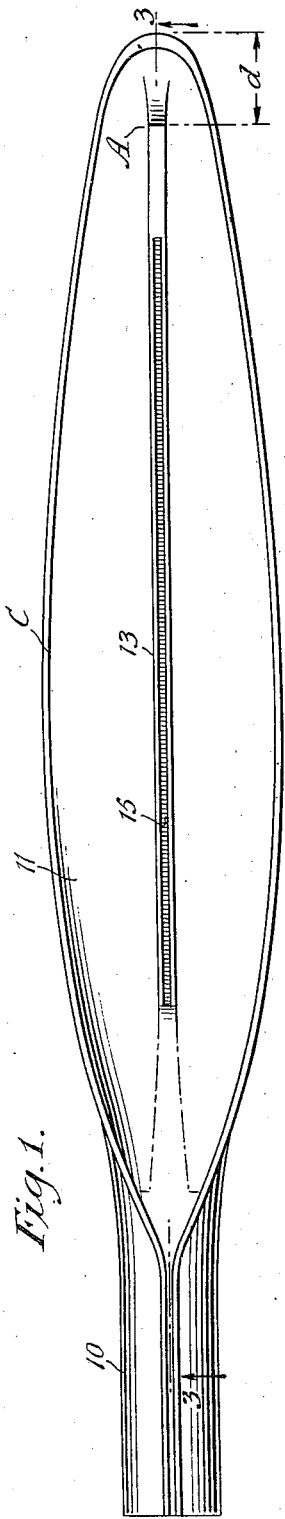
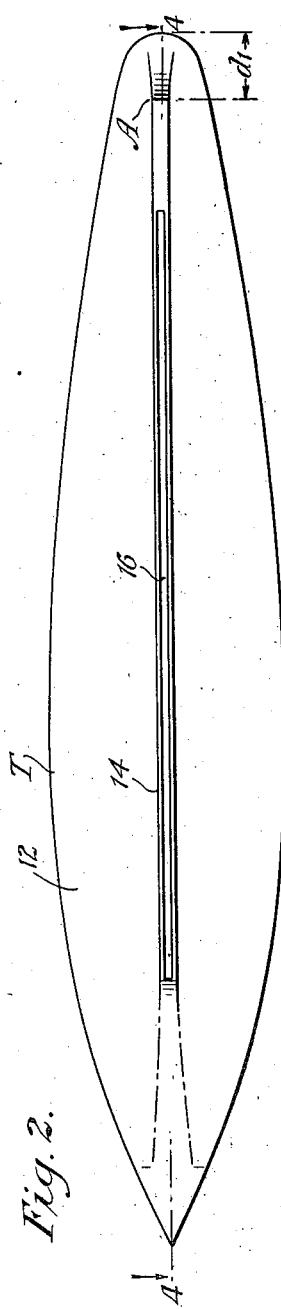
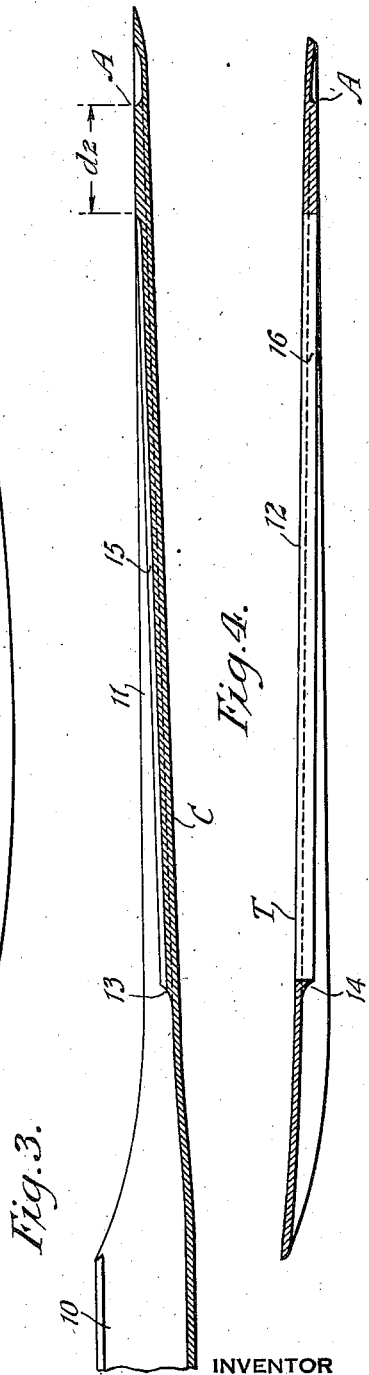

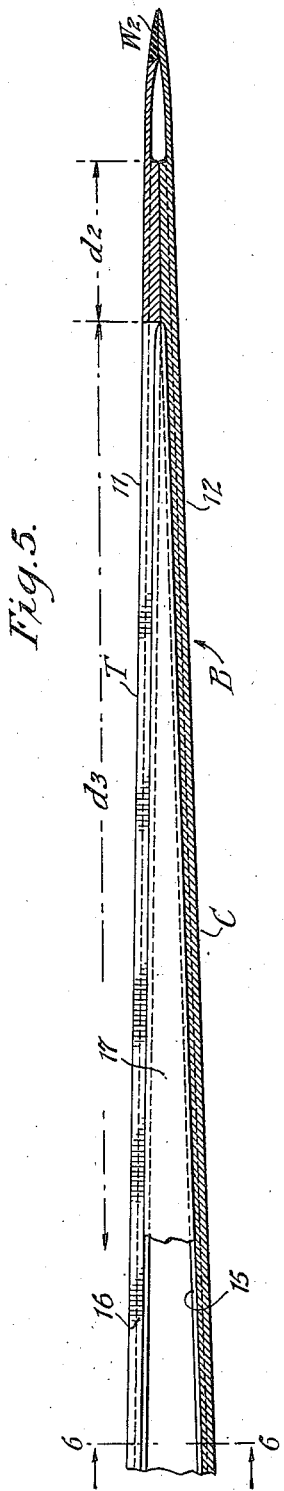
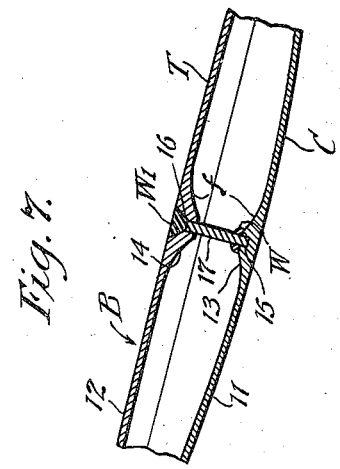
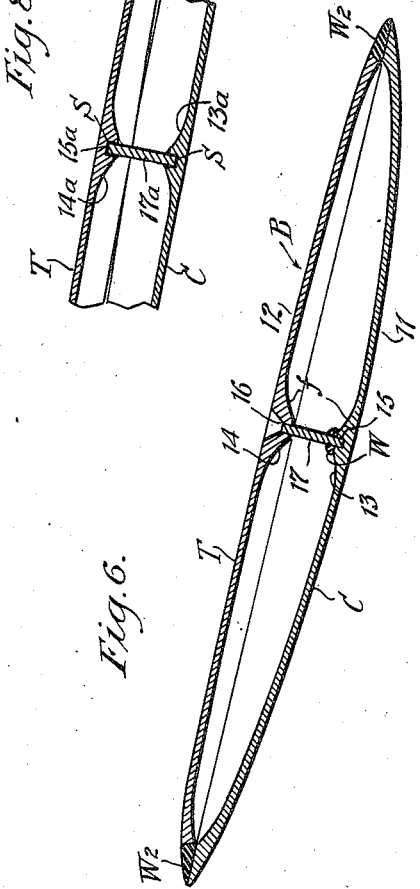
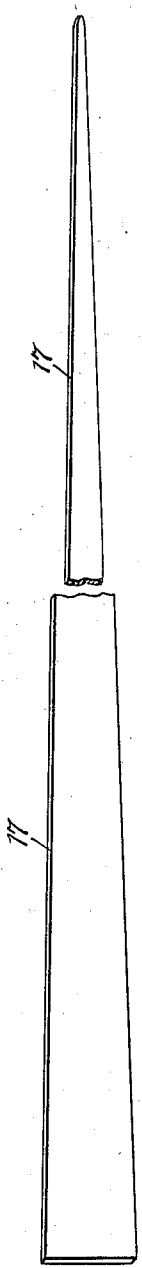

2,433,433

UNITED STATES PATENT OFFICE 2,433,433

REINFORCED PROPELLER BLADE

James H. McKee, North Caldwell, N. J., assignor to Curtiss-Wright Corporation, a corporation of Delaware Application January 29, 1944, Serial No. 520,350

4 Claims. (Cl. 170—159)

This invention relates to a hollow aircraft propeller blade which is provided with a novel reinforcing arrangement.

The invention has particular reference to a hollow propeller blade formed from plates disposed in facing relation and forming an interior chamber, each plate having a longitudinally extending rib formed integral therewith, the ribs facing each other throughout at least a part of the length thereof.

The invention has further reference to a propeller blade as herein described wherein a wedge-shaped connecting member bridges the space between and is connected to the aforesaid ribs.

Various other objects, advantages and features of my invention will become apparent from the following detailed description.

The invention resides in the reinforced hollow propeller blade, combinations and arrangements of the character hereinafter described and claimed.

For an understanding of the invention and for an illustration of one of the forms thereof, reference is to be had to the accompanying drawings, in which:

Figure 1 is a plan view of the camber plate section of a hollow propeller blade with a slotted rib formed on one face thereof;

Fig. 2 is a plan view of the underside of the thrust plate section of a hollow propeller blade and illustrating an open bevelled slot formed therein;

Fig. 3 is a longitudinal sectional view taken on the line 3—3 of Fig. 1;

Fig. 4 is a longitudinal sectional view taken on the line 4—4 of Fig. 2;

Fig. 5 is a fragmentary longitudinal sectional view of the camber and thrust plates in assembled relation with a reinforcing wedge-shaped member therebetween;

Fig. 6 is a transverse sectional view taken on the line 6—6 of Fig. 5;

Fig. 7 is a fragmentary view similar to Fig. 6;

Fig. 8 is a fragmentary view similar to Fig. 7 illustrating the invention as applied to both of the propeller forming plates; and Fig. 9 is a perspective view of the wedge-shaped rib connecting member per se.

Referring to Figs. 1 through 4, there is shown a metallic camber plate C and a complementary thrust plate T of the general character known in the art for forming a hollow propeller blade B.

As illustrated, the camber plate C comprises a tubular shank 10 having extended therefrom, the camber plate 11 proper which generally, is of convex configuration, the convexity decreasing in a progressive manner as the tip end of the plate is approached whereby said camber plate C defines a shallow opening of generally elliptical configuration. The thrust plate T comprises a plate proper 12 which generally is of elliptical configuration corresponding with the aforesaid shallow opening of the camber plate C and, to less extent than the latter, it has convex shape. As will be observed in Fig. 2, the thrust plate T does not include a shank end portion as does the camber plate C.

As illustrated, the plates C and T include the respective longitudinally extending integral ribs 13 and 14 which, when said plates are associated one with the other in assembled relation, are disposed substantially in spaced, facing relation or in a common plane. In the form of the invention herein shown, although not necessarily, the ribs 13 and 14 are formed, as described in the pending application of James H. McKee, Serial No. 493,314, filed July 2, 1943, now Patent Number 2,431,411, issued November 25, 1947, by subjecting uniformly thick plane sheets of metal stock, to two or more milling machine operations whereby each sheet of metal is longitudinally tapered in such manner that the thickness of each sheet of metal decreases longitudinally therealong toward the tip of the blade. The milling cutter is so constituted that, while the tapering operation proceeds, a longitudinal strip of the original sheet of metal remains intact and forms the aforesaid rib 13 or 14, the ends thereof toward the left terminating approximately at the respective locations A, Figs. 1, 2, 3 and 4. As a result of the described milling operations, the thickness or height of each of the ribs 13 and 14 increases progressively in a direction extending longitudinally along the propeller blade toward the tip thereof. Further, it is desirable that the milling cutter be so shaped that the described operation causes each of the ribs 13 and 14 to be bordered by fillets *f* as shown.

The ribs 13 and 14 thus formed on the camber and thrust plates C and T respectively, are subsequently subjected to a milling operation whereby a closed slot or channel 15 is formed in the rib 13, and an open slot 16 similarly formed in the rib 14. The closed slot 15 terminates short of the right-hand end of the rib 13, as does the open slot 16 with respect to the rib 14. The slot 16 extends through the rib 14 and the thrust plate T with its exterior marginal edges bevelled as clearly shown in Figs. 6 and 7. The closed slot 15, formed in the camber plate rib 13, is provided for the key-way like reception of one marginal edge portion of the tapered gusset or wedge-shaped connecting member indicated at 17 whereby a tongue-and-groove joint is formed which serves to more accurately locate the aforesaid connecting member 17 with respect to the aforesaid open slot 16, and thus assure accurate alinement of the wedge member 17 with the slot 16 when the thrust plate T is secured to the camber plate C. Moreover, the aforesaid slot 15 also provides for a more efficient welding of the wedge member 17 to the rib 13 by reason of the fillet of weld metal W accruing as a result of a welded tongue-and-groove joint. For a like reason, the marginal edges defining the slot 16, on the exterior face of the thrust plate T, are bevelled, as shown in Figs. 6 and 7, whereby a weld metal deposit W1, may be effected later in a welding operation to intimately secure the connecting wedge member 17 in the open slot 16 and to the thrust plate T. The weld W is made before assembling the plates T and C to one another, while the weld W1 is made after assembling the plates. Obviously, the aforesaid tongue-and-groove joint may be utilized in other manners and anywhere in the mechanical connection between the respective camber and thrust plates and such a connection may be formed in part at least by members other than the metal member or members herein described.

After the blank plates have been formed, the camber plate C and the thrust plate T are brought to finished form by subjecting each of the partially completed propeller plates to suitable milling, blanking and blade forming operations, the convex configuration and the pitch being imparted thereto during the operation last noted all as generally referred to in the aforesaid pending application. Thereafter, the aforesaid shallow opening of the camber plate C is closed by the thrust plate T and the said plates are secured together by weld metal W2, with the tapered gusset or wedge member 17 secured to and between said ribs by welds W and W1, as shown in Figs. 6 and 7, to form the reinforced hollow propeller blade B.

In the form of the invention herein shown, the rib 13 terminates short of the tapered end of the camber plate C a distance $d$ and the rib 14 terminates short of the tapered end of the thrust plate T a distance $d1$. Further, when the two plates C and T are properly assembled to form the propeller blade, facing surfaces of the ribs 13 and 14 are in engagement with each other or substantially so throughout a distance $d2$, Fig. 5. Still further, when the two plates C and T are assembled as described immediately above, facing surfaces of said ribs 13 and 14 are spaced from each other in a progressively increasing manner from left to right throughout a distance $d3$, Fig. 5. In accordance with the invention and for a reason hereinafter to be described, material is removed in a suitable manner from the thick end of each rib 13 and 14 to a length as indicated by the distance $d2$, for example, this being done prior to the time the plates C and T are assembled as described above.

In accordance with the invention, there is disposed in the space between the facing surfaces of the ribs 13 and 14, a connecting or reinforcing metallic wedge member, gusset or section of metal 17, Figs. 5, 6 and 7, which is of suitable tapered configuration so that it will span the space between the facing surfaces of the ribs 13 and 14 either entirely or substantially when the two plates C and T are assembled in blade forming relation. Ordinarily, the connecting member 17 is separately formed although, in a broader concept of the invention, the said member 17 may be constituted by weld metal, for example, which may be built up between the ribs 13 and 14 by a suitable welding operation.

In a preferred form of the invention, the connecting wedge member 17 is definitely located in a predetermined position with respect to the ribs 13 and 14 by means of the groove, closed slot, or channel 16 formed in the rib 13.

With the connecting wedge member 17 so located, it is secured or joined to the rib 13 in any suitable manner, for example, by a welded or brazed joint formed at the engaging or adjacent surfaces of said rib 13 and connecting member 17, this form of joint being produced in any suitable manner, as by metallic arc, resistance, atomic hydrogen welding, or brazing.

Thereupon, the thrust plate T is assembled in proper relation with the camber plate C and wedge member 17 as illustrated in Figs. 5, 6 and 7. As a result, the opposite edge surface of the wedge member 17 is brought into the open slot 16 in the thrust plate T and thus into engagement with the rib 14. Beyond the smallest end of the aforesaid wedge member 17, the ribs 13 and 14 are caused to engage each other or to be closely adjacent each other as hereinbefore mentioned and clearly shown in Fig. 5.

Accordingly, the thrust plate T, by means of the slotted rib 14, is suitably secured, as by a welding or equivalent operation, to those surfaces of the connecting wedge member 17 and the surfaces defining the slot 16 which it faces and projects into. In the form of the invention shown, although not necessarily, a welded or brazed joint is formed between the aforesaid rib 14 and the wedge member 17, by a suitable welding or brazing operation, a welded or brazed joint being also formed between the terminal end portions of the ribs 13 and 14 at the right of the aforesaid member 17, Fig. 5, to secure said rib portions directly together throughout the distance $d2$.

In the alternative arrangement illustrated in Fig. 8, the thrust plate T is provided with a rib 14a having a closed slot 15a formed therein instead of the open slot 16, shown in Fig. 6.

In this arrangement, the rib connecting member 17 is positioned in the respective rib slots with a suitable shim of copper or the like, for example, between the surfaces defining said slots and the tapering edges of the member 17 throughout the length thereof. The blade forming plates C and T are subsequently welded along the marginal edges thereof in known manner. Thereafter, the blade is subjected to the usual heat treating operations and it is during such heat treatment that the copper shim or lining S in each of the slots 15a fuses and brazes the connecting member 17 in the slots 15a whereby the plates are joined between the marginal edges thereof as will be understood.

As understood in the art of producing a hollow propeller blade from a pair of facing plates as hereinbefore referred to, the inner facing plate surfaces, in the area adjacent the tip of the blade are closely spaced. This spacing is so close that there would be interference between the ribs in said blade tip area were it not for the fact that the material defining a tapering rib surface is removed throughout the distance $d2$, Fig. 5. Therefore, in order to permit proper assembly of the plates C and T, the material defining said tapered rib sections in the region indicated at d2, is removed as aforesaid.

The operations described above result in the production of a hollow propeller blade B, wherein the thrust plate T is secured to the camber plate C and wherein the reinforcing structure comprising the ribs 13 and 14 together with the connecting wedge member 17 is operatively related to the two plates C and T to reinforce them.

The blade reinforcement comprising the ribs 13 and 14 together with the connecting member 17 increases the stiffness of the propeller forming plates with resultant decrease in the amplitude of plate vibration or deflection which may be excited aerodynamically or by engine pulsations. As a result, stresses within the said plates are reduced. Further, such increase in stiffness of the aforesaid plates raises the natural frequency thereof above the range of objectionable frequencies to some extent at least and this decreases the amplitude of plate vibration or deflection.

With respect to a propeller blade wherein the interior chamber is sealed, deformation of the airfoil surface may arise due to the difference of aerostatic pressures exteriorly and interiorly of the blade, this being caused (1) by pressure differences resulting from changes in altitude and (2) by pressure differences due to centrifugal action on the air in the interior blade chamber. The aforesaid blade reinforcement comprising the ribs 13 and 14 together with the wedge member 17 decreases this deformation of the airfoil surface.

Entirely independently of the wedge member 17 and the direct connection between the ribs 13 and 14 near the tip end of the blade, it will be understood that these ribs serve to stiffen the plates C and T in a desired manner. Further, each of said ribs 13 and 14 together with their respective fillets f serve in a highly advantageous manner as a base or extended support to which the connecting wedge member 17 is secured in the closed slot 15 and to the rib 13 of the camber plate C.

It shall be understood that the invention is applicable to various forms or types of hollow propeller blades and that it is not to be restricted to a propeller blade formed from two complementary plates. Thus, the plates referred to in the claims may be formed from a single piece of material. They need not be separate plates secured together in a suitable manner, for example, at their edges as described.

While the invention has been described with respect to a certain particular preferred example which gives satisfactory results, it will be understood by those skilled in the art, after understanding the invention, that various changes and modifications may be made without departing from the spirit and scope of the invention and it is intended therefore in the appended claims to cover all such changes and modifications.

What is claimed as new and desired to be secured by Letters Patent, is:

1. In a hollow metallic propeller blade, the combination with a pair of longitudinally tapered plates comprising a camber plate and a thrust plate disposed in facing relation and forming an interior chamber, of a longitudinally disposed rib integral with each of said plates, one of said ribs having an elongated channel formed lengthwise therein short of one end thereof, the other of said ribs having an elongated slot formed lengthwise therein short of one end thereof, and a wedge-shape connecting member bridging said ribs with its opposite margins disposed and welded in said channel and slot respectively, the remaining portion of each of said ribs beyond said member presenting plane parallel surfaces disposed along the neutral axis of said blade and welded together in direct contacting relation.

2. In a hollow metallic propeller blade, the combination with a pair of longitudinally tapered complementary plates comprising a camber plate and a thrust plate disposed in facing relation and forming an interior chamber, of a central longitudinally disposed rib integral with each of said plates, one of said ribs having an elongated channel therein short of one end thereof, the other of said ribs having an elongated aperture therein short of one end thereof, said ribs being disposed in a single plane and of constant height throughout the channeled and apertured portions thereof, and a tapered connecting member disposed in and bridging the space between said channeled and apertured portions and bonded therein in torque and groove relation, the remaining end portion of each of said ribs presenting parallel surfaces bonded together in direct contacting relation and disposed along the axial center of said blade.

3. In a hollow metallic propeller blade, the combination with a pair of longitudinally tapered plates comprising a camber plate and a thrust plate disposed in facing relation and forming an interior chamber, of a longitudinally disposed rib integral with each of said plates, one of said ribs having an elongated channel formed lengthwise therein, the other of said ribs having an elongated slot formed lengthwise therein, and a wedge shaped connecting member bridging said ribs with opposite edges disposed and welded in said channel and slot respectively.

4. In a hollow metallic propeller blade, the combination with a pair of longitudinally tapered plates comprising a camber plate and a thrust plate disposed in facing relation and forming an interior chamber, of a longitudinally disposed rib integral with each of said plates, one of said ribs having an elongated channel formed lengthwise therein, the other of said ribs having an elongated slot formed lengthwise therein, and a wedge shaped connecting member bridging said ribs with opposite edges disposed and welded in said channel and slot respectively, the weld at said channeled rib lying wholly within said blade, and the weld at said slotted rib extending from the edge of said connecting member through said slot to the blade surface.

JAMES H. McKEE.

REFERENCES CITED

The following references are of record in the file of this patent:

UNITED STATES PATENTS

| Number | Name | Date |
|---|---|---|
| 2,214,339 | McKee | Sept. 10, 1940 |
| 2,163,209 | Pungel | June 20, 1939 |
| 2,015,332 | Baumann | Sept. 24, 1935 |
| 2,231,888 | Couch | Feb. 18, 1941 |

FOREIGN PATENTS

| Number | Country | Date |
|---|---|---|
| 435,630 | Great Britain | Sept. 25, 1935 |
| 134,131 | Austria | Mar. 15, 1933 |
| 343,170 | Italy | Sept. 16, 1936 |